(12) United States Patent
Tillman

(10) Patent No.: US 11,945,674 B2
(45) Date of Patent: Apr. 2, 2024

(54) DOCUMENT STACKER WITH WEIGHT SENSOR

(71) Applicant: Plockmatic International AB, Hägersten (SE)

(72) Inventor: Anders Tillman, Hägersten (SE)

(73) Assignee: Plockmatic International AB, Hägersten (SE)

( * ) Notice: Subject to any disclaimer, the term of this patent is extended or adjusted under 35 U.S.C. 154(b) by 193 days.

(21) Appl. No.: 17/596,121

(22) PCT Filed: Jun. 3, 2020

(86) PCT No.: PCT/EP2020/065306
§ 371 (c)(1),
(2) Date: Dec. 3, 2021

(87) PCT Pub. No.: WO2020/245167
PCT Pub. Date: Dec. 10, 2020

(65) Prior Publication Data
US 2022/0297971 A1 Sep. 22, 2022

(30) Foreign Application Priority Data
Jun. 3, 2019 (SE) .................................. 1950647-6

(51) Int. Cl.
*B65H 31/10* (2006.01)
*B65H 43/06* (2006.01)
(Continued)

(52) U.S. Cl.
CPC ............. *B65H 31/10* (2013.01); *B65H 43/06* (2013.01); *G01G 17/02* (2013.01); *B42C 1/12* (2013.01);
(Continued)

(58) Field of Classification Search
CPC ........ B65H 31/00; B65H 31/04; B65H 31/08; B65H 31/10; B65H 31/12; B65H 31/28;
(Continued)

(56) References Cited

U.S. PATENT DOCUMENTS

| 6,378,860 B1 * | 4/2002 | Gutierrez | ............... B65H 31/10 271/265.04 |
| 2009/0146369 A1 * | 6/2009 | Yoshimura | ............. B65H 31/18 271/207 |

(Continued)

FOREIGN PATENT DOCUMENTS

| JP | 2000103567 A | 4/2000 |
| JP | 2008265990 A | 11/2008 |
| JP | 2010222091 A | 10/2010 |

OTHER PUBLICATIONS

PCT Search Report and Written Opinion for PCT Application No. PCT/EP2020/065306, dated Sep. 7, 2020, 10 pages.

*Primary Examiner* — Prasad V Gokhale
(74) *Attorney, Agent, or Firm* — Brake Hughes Bellermann LLP

(57) ABSTRACT

A document stacker (1) for receiving documents from a document processing device (3), wherein the document stacker comprises: a document support (4), and a frame (5), wherein the document support is attached to the frame by a linear guide means configured such that the document support is linearly movable with respect to the frame along a predetermined path of movement (7) inclined to a horizontal plane, and wherein the document stacker further comprises a load cell (14) configured to resist relative movement between the frame and the document support along said predetermined path and to emit an output signal representative of the load applied to the load cell by the document support.

10 Claims, 1 Drawing Sheet

(51) Int. Cl.
*G01G 17/02* (2006.01)
*B42C 1/12* (2006.01)
*B65H 31/28* (2006.01)

(52) U.S. Cl.
CPC .......... *B65H 31/28* (2013.01); *B65H 2402/52* (2013.01); *B65H 2402/53* (2013.01); *B65H 2405/353* (2013.01); *B65H 2515/10* (2013.01)

(58) Field of Classification Search
CPC ........ B65H 43/00; B65H 43/02; B65H 43/06; B65H 2402/52; B65H 2402/53; B65H 2405/35; B65H 2405/353; B65H 2511/15; B65H 2515/10; B65H 2553/21; B65H 2553/26; B65H 2601/22
See application file for complete search history.

(56) References Cited

U.S. PATENT DOCUMENTS

| | | |
|---|---|---|
| 2012/0217697 A1 | 8/2012 | Schoenmakers |
| 2015/0147153 A1* | 5/2015 | Ishizuka ............ G03G 15/6529 271/215 |
| 2017/0036882 A1* | 2/2017 | Yokoya .................. B65H 43/06 |

* cited by examiner

DOCUMENT STACKER WITH WEIGHT SENSOR

CROSS REFERENCE TO RELATED APPLICATIONS

This application is a 35 U.S.C. § 371 National Phase Entry Application from PCT Application No. PCT/EP2020/065306, filed on Jun. 3, 2020, entitled "A DOCUMENT STACKER WITH WEIGHT SENSOR", and designating the U.S., which claims priority to Swedish Patent Application No. 1950647-6, filed on Jun. 3, 2019, the disclosures of which are incorporated herein in their entireties by reference.

TECHNICAL FIELD

The present disclosure relates to document processing devices such as printers and booklet makers. Specifically, the present disclosure relates to improvements to stackers for receiving and temporarily storing documents received from the document processing devices after processing.

BACKGROUND

Document processing devices, such as printers, process a plurality of sheets to turn them into more valuable products such as books or booklets. Typically, a plurality of sheets are first printed and then joined by stapling and/or gluing. A common processing step is also to fold the plurality of sheets into a booklet with optional square folding of the back of the booklet. After the booklet is ready, it is fed onto a document stacker configured to hold a plurality of documents/booklets. The document stacker has a limited storage capacity and has to be regularly emptied. Some document stackers have a counting mechanism for counting the number of booklets received and a controller configured to emit a capacity signal indicating that the stacker is full or has reached a predetermined level of its maximum storage capacity. Thus, the preceding document processing device(s) may listen to the capacity signal of the document stacker and control its operation accordingly by slowing down or stopping processing of sheets in a suitable manner before the document stacker is full.

An additional challenge has proven to be that an operator at any time may pick a number of documents from the document stacker for further handling and/or inspection, thereby increasing the remaining capacity of the stacker. Such manual removal of documents from the document stacker makes it difficult to assess the remaining capacity of the document stacker and merely counting the number of documents fed onto the document stacker will not give a true count of the remaining capacity if an operator removes or adds documents to the document stacker.

Also, some document processing devices, such as printers, operate at high speed and require some time for start-up and spin-down before and after processing of sheets. Hence, it is advantageous to be able to correctly assess the remaining capacity and predict when the document stacker will be full in order to thereby be able to provide a capacity signal to the document processing device early enough for the document processing device to spin-down in a timely manner, i.e. controlled slow down and stop of the processing of documents.

Also, a wrong assessment of the remaining capacity may lead to the document stacker emitting a capacity signal indicating that the stacker would be full when it actually has remaining capacity, thereby causing a halt or spin-down of the preceding document processing device even though it is not yet needed. This leads to reduced production efficiency.

Accordingly, it is an object of the invention to provide an improved document stacker enabling improved assessment of remaining storage capacity of the document stacker.

JP2010222091A discloses an image forming device and program.

US2009/146369A1 discloses a sheet stacking apparatus, sheet processing apparatus, and image forming apparatus.

JP2000103567A discloses a paper sheet processing device.

JP2008265990A discloses a paper ejecting device and image forming device.

US2012217697A1 discloses a sheet stacking device for a sheet handling system.

SUMMARY

These and other objects are achieved by a document stacker according to a first aspect of the invention. The document stacker according to the first aspect is defined in claim 1 with embodiments described in the dependent claims 2-10. The document stacker comprises a document support, and a frame. The document support is attached to the frame by a linear guide means configured such that the document support is linearly movable with respect to the frame along a predetermined path of movement inclined to a horizontal plane, i.e. non-horizontal. Also, the document stacker comprises a load cell configured to resist relative movement between the frame and the document support along said predetermined path and to emit an output signal representative of the load applied to the load cell by the document support. In use, the document support receives documents from the document processing device and stores them one after the other on the document support. If the document support is full, processing of documents by the document processing device has to be halted. Sometimes, operators manually pick documents off the document support, such that plain counting of documents received from the document processing device cannot be used to determine the remaining capacity on the document support. It is advantageous to know the remaining capacity of the document support such that operation of the document processing device can be controlled in view of the remaining capacity to slow down or cease feeding of documents to the document stacker once the loading of the document stacker approaches the maximum loading capacity of the document stacker. The center of mass of the documents loaded on the document support varies as documents are fed onto the document support or removed from the document support, which makes is difficult to measure the load applied to the document support. By suspending the document support on the frame using a non-horizontal linear guide means, a single load cell can be used to measure the weight applied to the document support, independently of the center of mass of the load currently on the document support. This provides for a robust and inexpensive solution for keeping track of the remaining capacity of the document support.

The linear guide means may be configured such that the predetermined path of movement extends within the range of 0-15 degrees from vertical, or extends within the range of 0-5 degrees from vertical, or extends vertically. By so directing the path of movement, the weight of the document stacker and its contents can cause movement of the document support due to gravity. The movement is mitigated by the load cell which can then sense the applied force.

The linear guide means may comprise a rail portion and a corresponding bearing system configured to guide the rail portion for movement along the predetermined path of movement, said rail portion and said bearing system respectively being attached to a respective one of the document support and the frame.

The bearing system may comprise a plurality of opposing wheels between which the rail portion extends, wherein said plurality of wheels are spaced apart along at least a portion of the predetermined path.

The plurality of wheels may comprise at least one pair of wheels between which the rail portion extends, said pair of wheel opposing each other on opposite sides of the rail portion.

The document support may comprise an endless belt extending from an input portion of the document stacker. The endless belt can be used to move the documents carried by the document support such that more documents can easily be fed into the document stacker from the document processing device.

The document stacker may comprise an end stop provided at the outer end portion of the document stacker. The end stop prevents documents from falling off the document support. Together with an endless belt, the end stop enables the endless belt to slide relatively the documents and thereby force the documents together for compaction of the documents carried by the document support.

The end stop may be attached to the document support. Also, the end stop may be configured to prevent documents to be fed past the end stop.

The document stacker may comprise a controller configured:
  to receive the output signal of the load cell and derive a load value indicative of the weight applied to the document support, to compare the load value to a capacity value indicative of the maximum load of documents the document support is able to carry before being full, and
  to emit a capacity signal once the load parameter exceeds a predetermined fraction of the capacity value.

In use, the document stacker receives more and more documents wherein the weight carried by the document support increases. The load cell reacts to the increased weight and emits a signal used to calculate a load value used for comparison with the maximum permitted load of the document support. The maximum permitted load of the document support however varies by the dimensions and weight of the documents loaded onto the document support. For example, light-weight documents of large size will fill the whole document support without creating high load. Hence, the use of a capacity value allows for custom setting corresponding to the relevant use case. This setting could be fixed, or it could be dynamically set by an input signal from an external device, or it could be set by an operator using a user interface. Once the load value exceeds a predetermined fraction of the capacity value, the document stacker emits a capacity signal indicating to the operator and/or to the document handling device feeding the document stacker, that the document stacker is about to become full, or is full, thereby enabling the document processing device to adapt its operation and/or cease feeding of documents to the document stacker. The signal also indicates to the operator that it is time to empty the document stacker.

BRIEF DESCRIPTION OF DRAWINGS

FIG. 1 shows a side view of the document stacker.

FIG. 2 shows a front view of the document stacker as seen from the document processing device.

| | |
|---|---|
| 1 | document stacker |
| 2 | document |
| 3 | document processing device |
| 4 | document support |
| 5 | frame |
| 6 | outer portion (of document support) |
| 7 | path of movement |
| 8 | horizontal plane |
| 9 | rail portion |
| 10 | wheels |
| 11 | endless belt |
| 12 | input portion |
| 13 | end stop |
| 14 | load cell |

DETAILED DESCRIPTION

A first embodiment of the document stacker 1 will hereinafter be described with reference to the appended drawings. It should be noted that the drawings are schematic and not drawn to scale.

Figure 1:
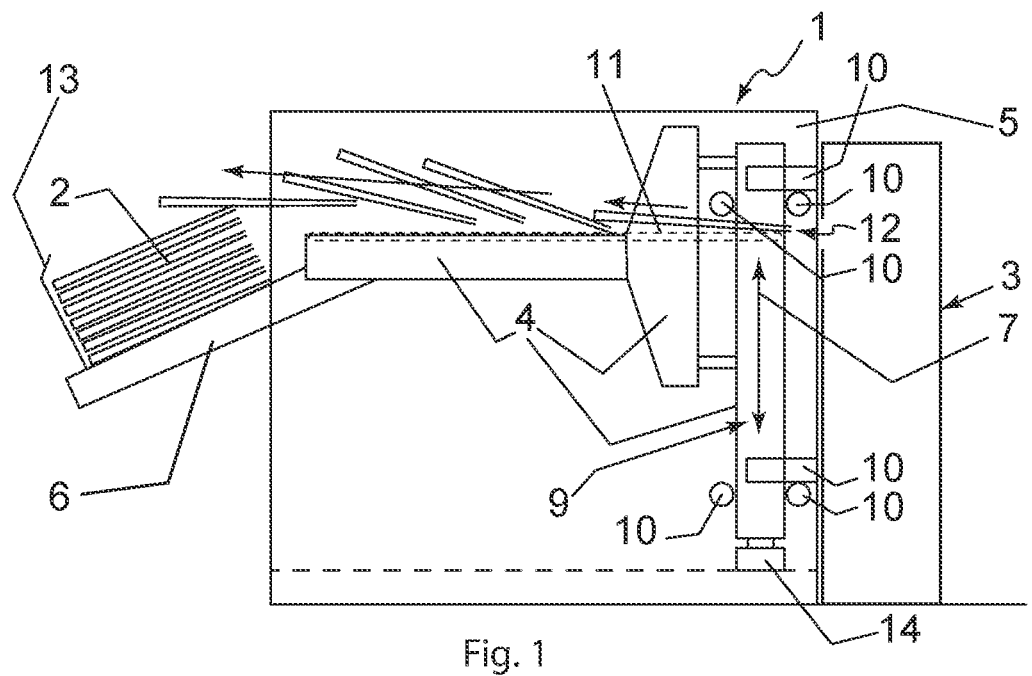
FIGS. 1-2 show a document stacker according to a first embodiment.

As shown in FIG. 1, the document stacker 1 is positioned after a document processing device 3 for receiving and storing the documents 2 processed by the document processing device 4. In this example, the document processing device 3 is a booklet folding device but it could alternatively be a printer or any other suitable type of document processing device capable of outputting documents 2 such as booklets, and books.

The document stacker 1 comprises an input portion 12 at which the document stacker 1 receives documents 2 from the booklet folding device 3. Documents 2 received by the document stacker 1 are forced from the input portion 12 onto a document support 4 comprising an endless belt 11. In other embodiments, the endless belt 11 may alternatively be omitted wherein some other supporting structure, such as a table, could be used instead.

The endless belt 11 moves the documents 2 received from the inlet portion 12 towards the opposite end of the document support 4.

The document support 4 comprises an outer portion 6 which is downwardly inclined with respect to the endless belt 11 which is horizontal. In other embodiments, the outer portion could be omitted, or it could be otherwise oriented, such as horizontal. The downwards inclination of the outer portion 6 helps the documents 2 received to move by the force of gravity along the outer portion as shown in FIG. 1.

In order to prevent documents 2 from being fed past and off the outer portion 6 of the document support 4, the document stacker 1 comprises an end stop 13. The end stop 13 is in this embodiment attached to the outer portion 6 of the document support 4, but could in other embodiments be attached to some other portion of the document stacker 1. The end stop 13 extends perpendicularly to the outer portion 6 such that documents 2 cannot slide past the end stop 13. In other embodiments, an angle other than perpendicular could be chosen as long as the end stop in its normal use position is able to prevent documents 2 from moving past the end stop 13.

The document support 4 is attached to the frame 5 by a linear guide means 9, 10 configured such that the document support 4 is linearly movable with respect to the frame 5 along a predetermined path of movement 7 inclined to the horizontal plane 8. The term 'inclined' is to be understood as comprising all directions giving a degree of vertical extent, i.e. non-horizontal, including fully vertical. Another wording than 'inclined' which could be used interchangeably is thus 'non-horizontal'. The document stacker 1 further comprises a load cell 14 configured to resist relative movement between the frame 5 and the document support 4 along said path of movement 7 and to emit an output signal representative of the load applied to the load cell 14 by the document support 4. The term 'resist relative movement.' is to be understood as allowing the load cell 14 to deform slightly to allow it to output various readings. Hence, the movable document support 4 moves towards the load cell 14 and presses the load cell 14, which in turn could be supported by any suitable means, such as attached to the frame 5 of the document stacker 1, or configured to bear directly against the floor on which the document stacker 1 is placed.

The linear guide means is configured such that the predetermined path of movement 7 extends vertically, but could in other embodiments alternatively extend within the range of 0-15 degrees from vertical, such as 0-5 degrees to vertical.

Figure 2:
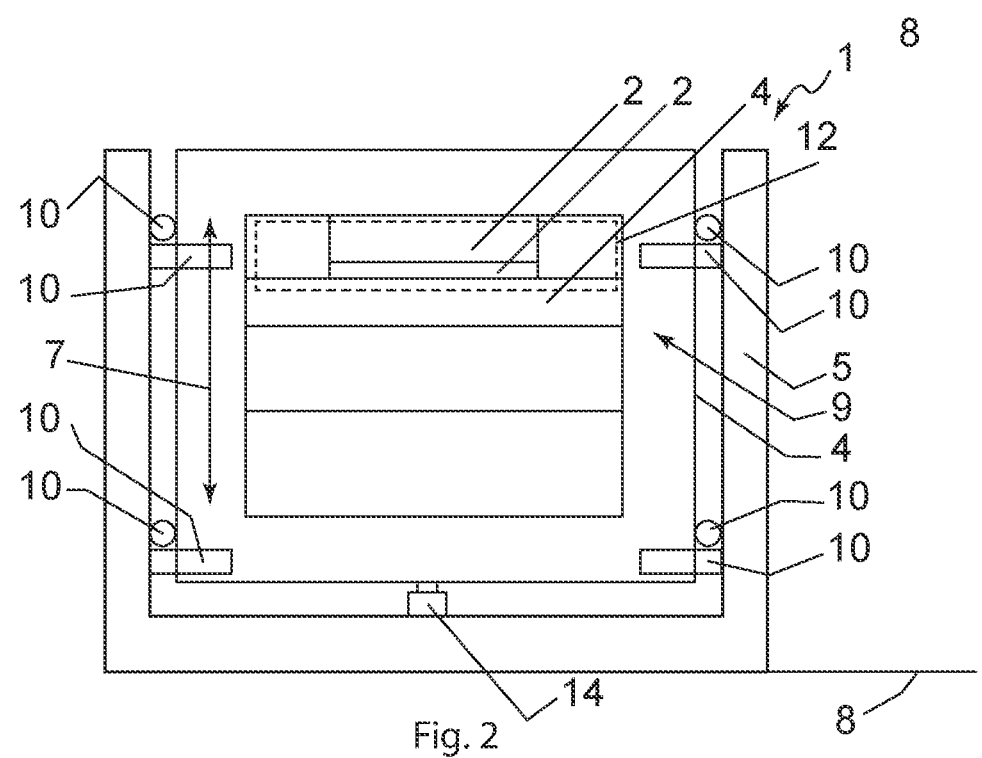

The linear guide means comprises a rail portion 9 provided in the form of the left and right vertically extending tubes of the document support 4 as shown in FIGS. 1 and 2. The rail portion 9 provides a surface along which the a corresponding bearing system of the linear guide means guides the rail portion 9 for movement along said predetermined path of movement 7. Accordingly, the bearing system is attached to the frame 5 which stands on the floor (floor not shown). In other embodiments, the bearing system could instead be attached to/comprised in the document support 4 and the rail portion 9 accordingly attached to/comprised in the frame 5.

In this embodiment, the bearing system comprises a plurality of opposing wheels 10 between which the rail portion 9 extends, wherein said plurality of wheels 10 are spaced apart along a portion of the predetermined path of movement 7. As shown in FIG. 1, the plurality of wheels 10 comprise at least one pair of wheels 10 between which the rail portion 9 extends, said pair of wheels 10 opposing each other on opposite sides of the rail portion 9. In other embodiments, the wheels 10 could alternatively be otherwise arranged, such as with the opposing wheels distributed along the predetermined path of movement 7 but not on the same vertical level. Also, it should be understood that rotary bearings or any other suitable type of bearing could be used instead of the wheels.

The document stacker 1 comprises a controller configured to receive the output signal of the load cell 14 and derive a load value indicative of the weight applied to the document support 4. The controller is also configured to compare the load value to a capacity value indicative of the maximum load of documents 2 the document support 4 is able to carry before being full. Further, the controller is configured to emit a capacity signal once the load parameter exceeds a predetermined fraction of 80% of the capacity value, although the fraction could alternatively be any suitable fraction such as 70%, 0%, 90% or 100% of the capacity value depending on the circumstances such as the spin-down time and processing rate of the preceding document processing device 3. By weighing the documents 2 carried by the document support 4, an accurate count of documents 2 is enabled, accounting for any documents 2 removed from the document support 4.

The invention claimed is:

1. A document stacker for receiving documents from a document processing device, wherein the document stacker comprises:
   a document support, and
   a frame,
   wherein the document support is attached to the frame by a linear guide means configured such that the document support is linearly movable with respect to the frame along a non-horizontal predetermined path of movement, and
   wherein the document stacker further comprises a load cell configured to resist relative movement between the frame and the document support along said path of movement and to emit an output signal representative of the load applied to the load cell by the document support.

2. The document stacker according to claim 1, wherein the linear guide means is configured such that the predetermined path of movement extends within a range of 0-15 degrees from vertical, or extends within a range of 0-5 degrees from vertical, or extends vertically.

3. The document stacker according to claim 1, wherein the linear guide means comprises a rail portion and a corresponding bearing system configured to guide the rail portion for movement along said predetermined path of movement, said rail portion and said bearing system respectively being attached to a respective one of the document support and the frame.

4. The document stacker according to claim 3, wherein the bearing system comprises a plurality of opposing wheels between which the rail portion extends, wherein said plurality of wheels are spaced apart along at least a portion of the predetermined path of movement.

5. The document stacker according to claim 4, wherein the plurality of wheels comprises at least one pair of the plurality of wheels between which the rail portion extends, the pair of wheels opposing each other on opposite sides of the rail portion.

6. The document stacker according to claim 1, wherein the document support comprises an endless belt extending from an input portion of the document stacker.

7. The document stacker according to claim 1, wherein the document stacker comprises an end stop provided at an outer end portion of the document stacker.

8. The document stacker according to claim 7, wherein the end stop is attached to the document support.

9. The document stacker according to claim 7, wherein the end stop extends obliquely to the document support to prevent documents to be fed past the end stop.

10. The document stacker according to claim 7, wherein the document stacker comprises a controller configured:
    to receive the output signal of the load cell and derive a load value indicative of a weight applied to the document support,
    to compare the load value to a capacity value indicative of a maximum load of documents the document support is able to carry before being full, and
    to emit a capacity signal once a load parameter exceeds a predetermined fraction of the capacity value.

* * * * *